United States Patent
Shao et al.

(10) Patent No.: US 11,422,029 B1
(45) Date of Patent: Aug. 23, 2022

(54) MANAGING STABILITY IN SPECTROSCOPY MEASUREMENT SYSTEMS

(71) Applicant: Intelon Optics, Inc., Lexington, MA (US)

(72) Inventors: Peng Shao, Edmonton (CA); Paul Robert Parise, Clinton, CT (US); Kwangsup Shin, Chestnut Hill, MA (US); Maxwell Kotlarchyk, Arlington, MA (US)

(73) Assignee: Intelon Optics, Inc., Lexington, MA (US)

( * ) Notice: Subject to any disclaimer, the term of this patent is extended or adjusted under 35 U.S.C. 154(b) by 0 days.

(21) Appl. No.: 17/101,509

(22) Filed: Nov. 23, 2020

Related U.S. Application Data

(60) Provisional application No. 62/939,231, filed on Nov. 22, 2019.

(51) Int. Cl.
| | |
|---|---|
| *G01J 3/02* | (2006.01) |
| *G01J 3/45* | (2006.01) |
| *G01J 3/26* | (2006.01) |
| *G01J 3/10* | (2006.01) |
| *G01J 3/28* | (2006.01) |
| *G01N 21/27* | (2006.01) |

(52) U.S. Cl.
CPC ............... *G01J 3/0286* (2013.01); *G01J 3/10* (2013.01); *G01J 3/26* (2013.01); *G01J 3/2803* (2013.01); *G01J 3/45* (2013.01); *G01N 21/274* (2013.01)

(58) Field of Classification Search
None
See application file for complete search history.

(56) References Cited

U.S. PATENT DOCUMENTS

| | | | |
|---|---|---|---|
| 5,510,269 A * | 4/1996 | Black | G01N 21/274 250/252.1 |
| 7,898,656 B2 | 3/2011 | Yun et al. | |
| 8,115,919 B2 | 2/2012 | Yun et al. | |
| 2005/0046837 A1* | 3/2005 | Izumi | G02B 27/0087 356/326 |
| 2007/0233056 A1 | 10/2007 | Yun | |
| 2012/0302862 A1 | 11/2012 | Yun et al. | |
| 2019/0017872 A1* | 1/2019 | Brunson | G01J 3/28 |
| 2020/0278250 A1* | 9/2020 | Scarcelli | G01J 3/0208 |
| 2021/0181018 A1* | 6/2021 | Yun | G01J 3/0227 |

* cited by examiner

*Primary Examiner* — Shawn Decenzo
(74) *Attorney, Agent, or Firm* — Young Basile Hanlon & MacFarlane, P.C.

(57) ABSTRACT

Input light comprising an optical signal associated with a spectrum of at least a portion of the input light is received into an interferometer. Data comprising an image is provided using a detector array comprising detection elements. Output light is received from the interferometer into a set of one or more optical elements, which provide an optical interference pattern associated with an intensity of at least a portion of the output light that is distributed over a set of detection elements. Detection of the optical signal is stabilized based at least in part on the data using a control system comprising: a light-control module that controls a first feedback loop that stabilizes the portion of the output light; and/or a temperature-control module that controls a second feedback loop that stabilizes a temperature sensed by at least one temperature sensor within a thermal environment associated with the interferometer.

19 Claims, 18 Drawing Sheets

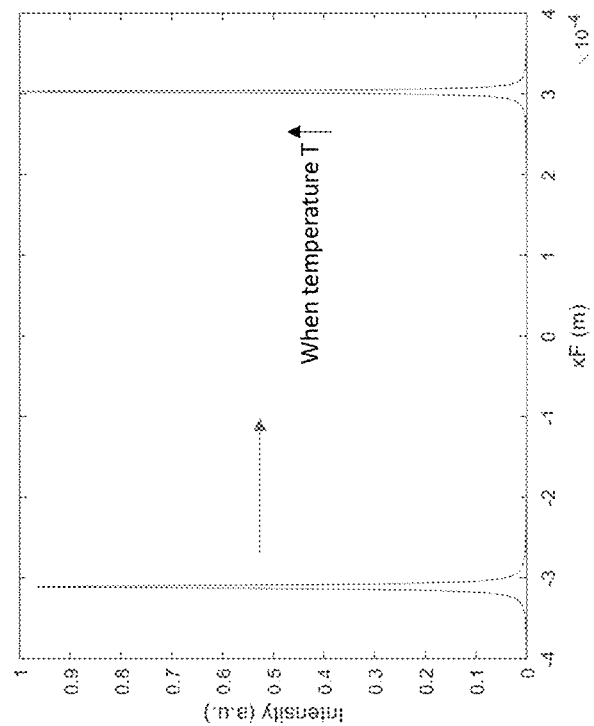
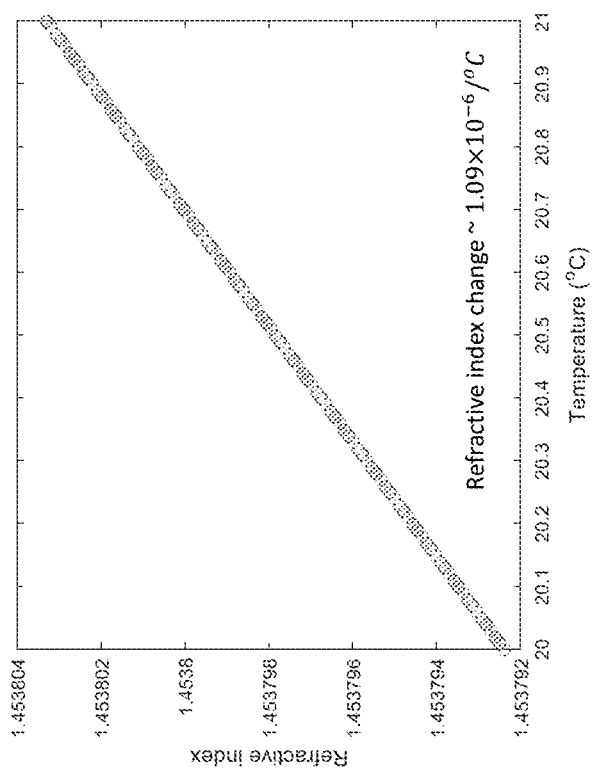
FIG. 5C
FIG. 5D

MANAGING STABILITY IN SPECTROSCOPY MEASUREMENT SYSTEMS

CROSS-REFERENCE TO RELATED APPLICATIONS

This application claims priority to and the benefit of U.S. Provisional Application Ser. No. 62/939,231, entitled "Managing Stability In Spectroscopy Measurement Systems," filed Nov. 22, 2019, which is incorporated herein by reference.

TECHNICAL FIELD

This disclosure relates generally to systems and methods for stabilized high-precision spectroscopy, and in particular, temperature-stabilized optical spectroscopy.

BACKGROUND

Frequency stability is important for many optical spectroscopy applications, such as Raman scattering and Brillouin scattering and other scattering-based optical spectroscopy techniques. In these techniques, a light source is employed to provide light that interacts with a sample to generate signals with shifted wavelength or frequency, which can be sensed by a spectroscopy measurement system that may be configured to use a filtering or a dispersion scheme, for example. Drifts of properties of the light source and/or the measurement system may cause degradation of signal recording, and thus potential reduction of the accuracy or precision of the measurements.

For example, for a diode laser, drift of the output frequency on the order of 1 GHz is possible. This output frequency drift can cause difficulty in spectroscopy measurements of, for example, spectroscopy based on Brillouin scattering (or "Brillouin spectroscopy"), which has a limited measurements window, and a frequency shift usually on the same order as the laser frequency drift. Drifts associated with a dispersion component due to variations of environmental factors, such as for example, ambient temperature, cause instability in the measurement system. A virtually-imaged phased array (VIPA) can be used as a dispersion component in Brillouin spectroscopy, and a VIPA made of fused silica usually drifts on the order of GHz/° C. when temperature changes. This causes potential difficulty when measuring a Brillouin frequency shift, which may fall in the range of 5-20 GHz, for example.

SUMMARY

In one aspect, in general, an optical spectrometer comprises: a first set of one or more optical elements configured to provide input light, where the input light comprises an optical signal associated with a spectrum of at least a portion of the input light; an interferometer configured to receive the input light from the first set of one or more optical elements and to provide output light; a detector array comprising multiple detection elements, where the detector array is configured to provide data comprising an image; a second set of one or more optical elements configured to receive the output light from the interferometer and to provide an optical interference pattern associated with an intensity of at least a portion of the output light that is distributed over a set of detection elements of the detector array; and a control system configured to stabilize detection of the optical signal based at least in part on the data comprising the image, the control system comprising one or both of: a light-control module configured to control a first feedback loop that stabilizes the portion of the output light that is distributed over the set of detection elements; and/or a temperature-control module configured to control a second feedback loop that stabilizes a temperature sensed by at least one temperature sensor within a thermal environment associated with the interferometer.

In another aspect, a method for analyzing an optical spectrum comprises: providing input light using a first set of one or more optical elements, where the input light comprises an optical signal associated with a spectrum of at least a portion of the input light; receiving the input light from the first set of one or more optical elements into an interferometer, and providing output light from the interferometer; providing data comprising an image using a detector array comprising multiple detection elements; receiving the output light from the interferometer into a second set of one or more optical elements and providing from the second set of one or more optical elements an optical interference pattern associated with an intensity of at least a portion of the output light that is distributed over a set of detection elements of the detector array; and stabilizing detection of the optical signal based at least in part on the data comprising the image using a control system, the control system comprising one or both of: a light-control module that controls a first feedback loop that stabilizes the portion of the output light that is distributed over the set of detection elements; and/or a temperature-control module that controls a second feedback loop that stabilizes a temperature sensed by at least one temperature sensor within a thermal environment associated with the interferometer.

Aspects can include one or more of the following features.

At least one of the first feedback loop or the second feedback loop is configured to use the data comprising the image to provide feedback.

The data comprising the image is used to provide feedback that includes respective spatial positions of one or more spectral components represented in the image.

The control system is configured to use the data comprising the image to determine an operational range over which at least one of the first feedback loop or the second feedback loop operates.

The first feedback loop provides a measurement that is used to determine an operational range over which the second feedback loop operates.

The control system comprises the light-control module.

A rotation stage controlled by the first feedback loop is configured to tilt at least a portion of the interferometer to change the optical interference pattern.

The interferometer comprises at least one Febry-perot etalon, or at least one virtually-imaged phased array (VIPA).

At least one optical element in the first set of one or more optical elements or the second set of one or more optical elements and controlled by the first feedback loop is configured to change an angle of propagation of at least a portion of the input light or the output light such that the set of detection elements of the detector array over which the portion of the output light is distributed changes.

A beam-blocking element that blocks at least a portion of the output light and is controlled by the first feedback loop is configured to move as an angle of propagation of at least a portion of the output light changes and the set of detection elements of the detector array over which the portion of the output light is distributed changes.

At least one optical element in the first set of one or more optical elements or the second set of one or more optical elements and controlled by the first feedback loop is configured to provide absorption of optical power over a portion of the spectrum.

The input light is provided from a measurement system that receives light from a frequency-tunable light source that is controlled by the first feedback loop and is configured to tune a frequency of the light received by the measurement system such that the set of detection elements of the detector array over which the portion of the output light is distributed changes.

The interferometer has a tunable characteristic that is controlled by the first feedback loop and is configured to change the optical interference pattern.

The interferometer comprises at least one tunable Fabry-Perot etalon, or at least one virtually-imaged phased array (VIPA).

The control system comprises the temperature-control module.

The thermal environment is characterized by an ambient temperature within a thermally isolated chamber in which the interferometer is enclosed.

The thermally isolated chamber encloses the interferometer and the detector array.

The temperature-control module comprises the thermally isolated chamber, a temperature sensor thermally coupled to the thermally isolated chamber, and a heating element thermally coupled to the thermally isolated chamber.

Other features and advantages will become apparent from the following description, and from the figures and claims.

BRIEF DESCRIPTION OF THE DRAWINGS

The disclosure is best understood from the following detailed description when read in conjunction with the accompanying drawings (in the Appendix document). It is emphasized that, according to common practice, the various features of the drawings are not to-scale. On the contrary, the dimensions of the various features are arbitrarily expanded or reduced for clarity.

FIGS. 5A, 5B, 5C, 5D, and 5E are plots that illustrate examples of the VIPA performance instability caused by temperature change.

DETAILED DESCRIPTION

Figure 1:
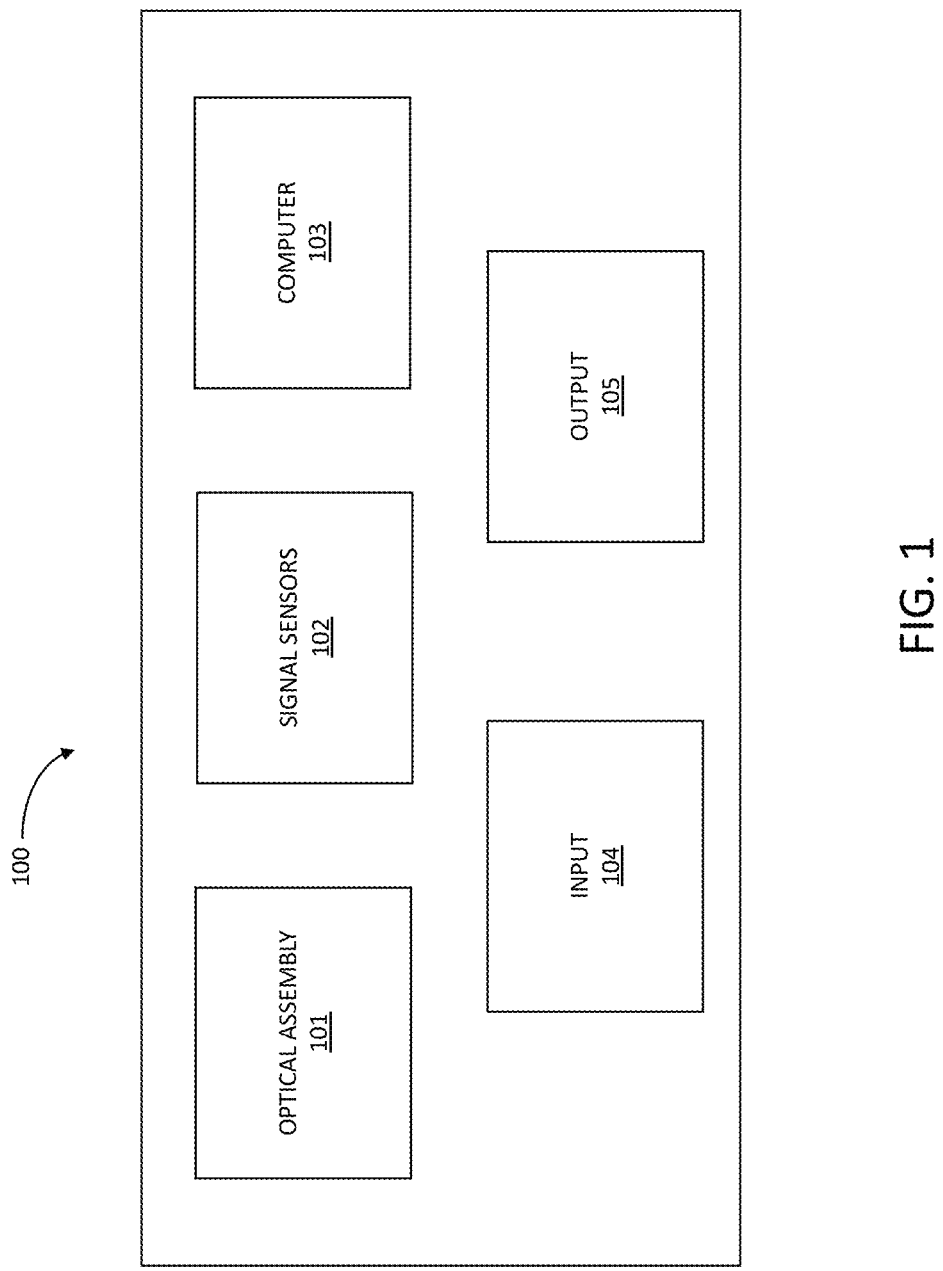
FIG. 1 is a schematic diagram illustrating a spectroscopy measurement system.

In precision spectroscopy applications, managing stability to minimize or reduce potential drifts of properties associated with components of a spectroscopy measurement system (e.g., light frequency or light propagation angle or position) due to environmental changes (e.g., temperature changes or mechanical vibration) is useful. One example of a spectroscopy measurement system is an interferometer-based Brillouin spectrometer. With the high dispersion of the interferometer, the spectral components of the light received from a sample can be dispersed to a very high degree on a detector array. Various types of stability management, described in more detail below, can be combined to achieve stable performance of optical components of the spectrometer during environmental changes to accurately measure a signal associated with one or more expected spectral component (e.g., spectral components having a Brillouin spectrum resulting from a Brillouin scattering interaction). Examples of Brillouin scattering interactions and how they can be used for performing spectroscopic measurements, and other spectroscopy techniques that can be used in the systems described herein, are described in U.S. Pat. Nos. 7,898,656, 8,115,919, U.S. Patent Application 2007/0233056, and U.S. Patent Application 2012/0302862, each of which is incorporated herein by reference.

Performance instability of the optical components due to environmental changes can contribute to measurement inaccuracies and other difficulties, if not adequately managed. In Brillouin spectroscopy (also called Brillouin microscopy), etalon-structured interferometers can be used. For Fabry-Perot etalons and virtually-imaged phased arrays (VIPAs), fused silica is an example of a material that can be used for a spacer in a "sandwich" structure of the etalon. Temperature-induced refractive index variations can significantly affect the interference performance of the etalon. For example, at a wavelength of 780 nm, the temperature changes of a 4.72-mm thick VIPA can shift the frequency of the signal as much as around 4 GHz/° C. or more.

A characteristic spectrum associated with a signal that is being measured can be characterized by a "peak wavelength" corresponding to a wavelength of a spectral component within the spectrum having the highest amplitude, and a "wavelength span" corresponding to a difference between maximum and minimum wavelengths over which the spectral components of the spectrum are distributed. The wavelength span of the Brillouin spectrum associated with the signal that the measurement system is configured to measure may be relatively small compared to other optical applications. Drifts of the source wavelength of light from the light source can cause drifts of a peak wavelength of the Brillouin spectrum that may be much bigger than the wavelength span of the Brillouin spectrum, and can therefore cause difficulties in data instrumentation and data processing. Examples of causes of drift of the source wavelength for a current pumped laser source is a relatively heavy dependence of the source wavelength on operating temperature of the laser and pump current.

The peak wavelength of the Brillouin spectrum may be based on a Brillouin frequency shift (relative to a source frequency) that falls in a range of about 5-20 GHz for various types of samples/interactions, which corresponds to a wavelength shift (relative to the source wavelength) of only 0.010 nm-0.040 nm. For example, the Brillouin frequency shift from pure water at room temperature is about 5.10 GHz at 780 nm. Spectral stability of some light sources on the other hand can be very poor.

The spectral amplitude of a Brillouin signal is usually orders-of-magnitude lower when compared to a spectral amplitude due to Rayleigh scattering of the light from the light source. So, filtering of the spectral component representing the light source (e.g., a laser line having a relatively narrow linewidth) is used in some implementations of the measurement system. For example, Brillouin signals from human corneal tissue is about 50 dB lower than the intensity of the Rayleigh scattering photons at 780 nm. The filter may be physical spatial filter or a light setup, such as for example, an etalon-based notch filter, or a light-absorbing gas cell. For example, a Rubidium gas cell can be used for a 780 nm light source. Drifts of the laser line may cause failure of the filtering.

The present disclosure describes examples of systems configured for stabilized spectroscopy to facilitate accurate and stable spectrum measurements, or specifically to alleviate environmental effects on the spectrum measurements.

FIG. 1 illustrates an example of various components that can be included within a spectroscopy measurement system 100 that is configured to perform spectroscopy measurements. The system 100 includes an optical assembly 101, one or more signal sensor(s) 102 to detect an optical signal (e.g., a Brillouin signal), an input module 104 for receiving input and optional instructions, an output module 105 for reporting results, and a computer 103 (e.g., a computing system including at least one processor, or specialized electronic circuitry) for data recording and analysis. The computer 103 has also the capabilities to communicate with and/or control various components and mechanisms within the system 100, including various sensors and controllers in the system 100 for temperature control, motorized stage control, etc.

Figure 2A:
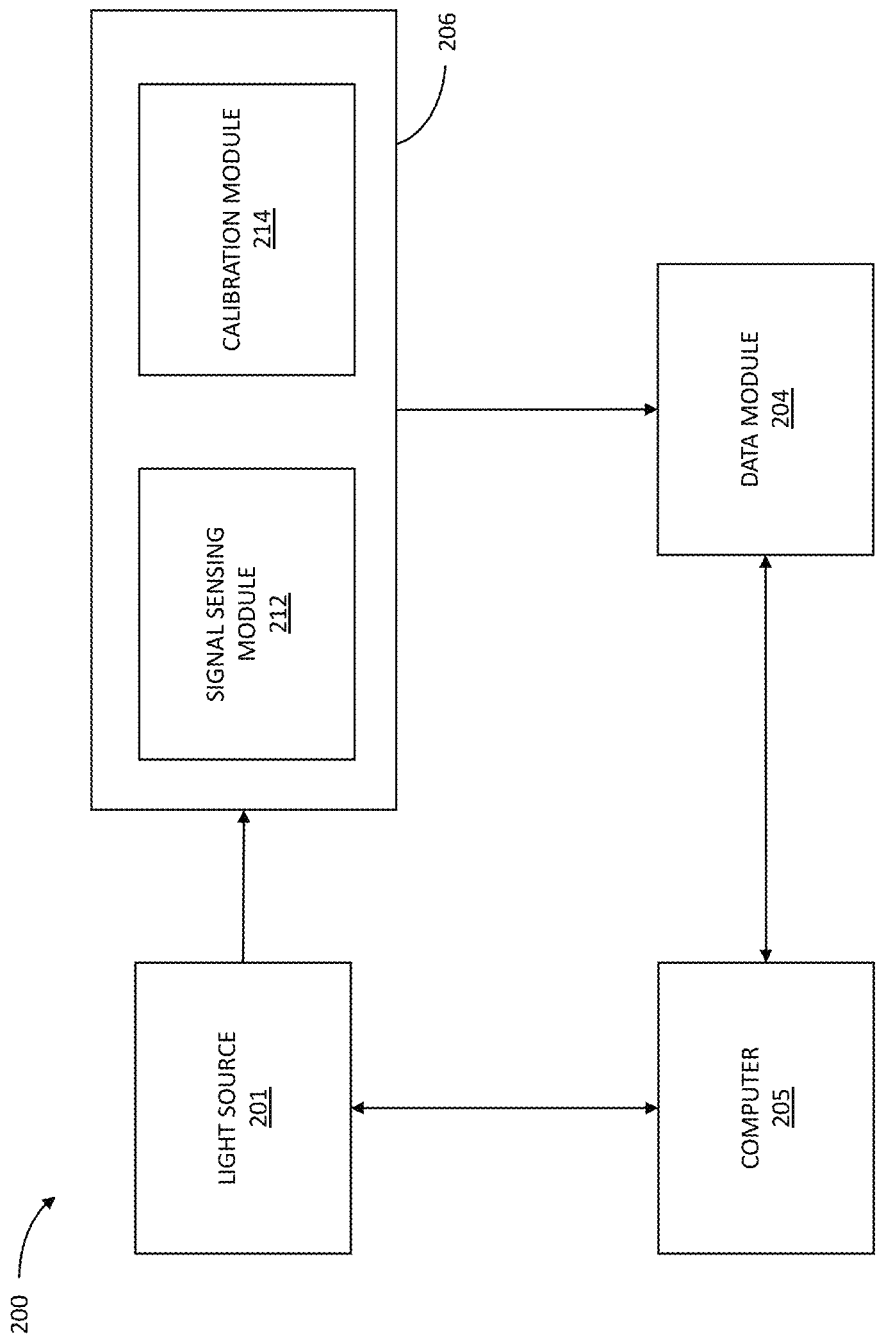
FIG. 2A is a schematic diagram of an example embodiment of the spectroscopy measurement system.

FIG. 2A illustrates one example of an arrangement of a spectroscopy measurement system 200 showing communication among different system components. Light coming out of a light source 201 is delivered to a measurements module 206 that includes a signal sensing module 212 and a calibration module 214. A data module is used to sense and record the data from the measurements module, and a computer 205 is used to control various aspects of the system, which may involve communication to/from the light source 201 and the data module 204. The calibration module 214 provides 'standard' signals to serve as the calibration baseline. The data module 204 is configured accordingly to stabilize the spectroscopy measurement, for example, based on algorithms performed by the computer 205.

Figure 2B:
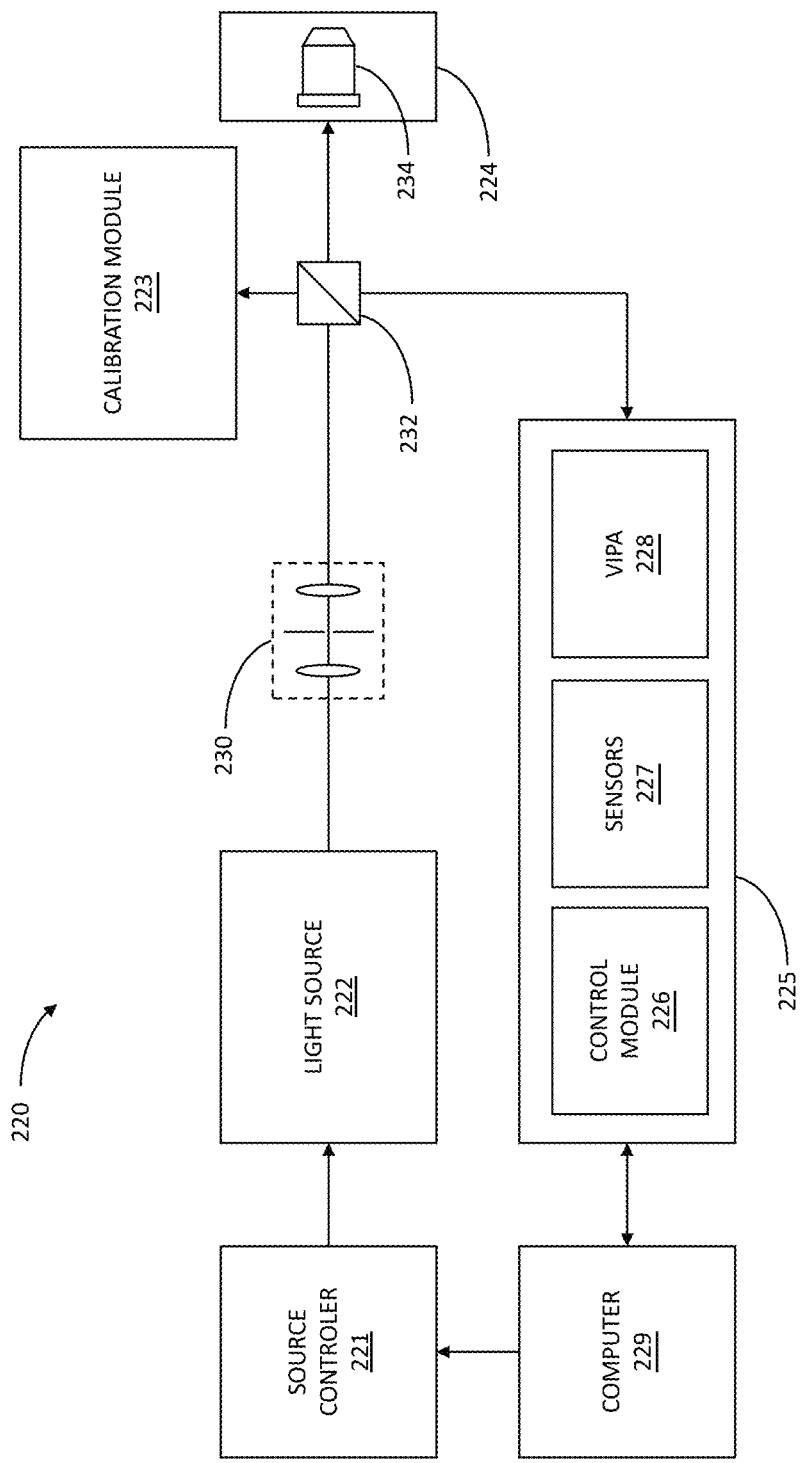
FIG. 2B is a schematic diagram of an example embodiment of the spectroscopy measurement system using VIPA-based spectrometer.

FIG. 2B illustrates one example of a Brillouin spectroscopy measurement system 220. A light source 222 is controlled by source controller 221. The light source 222 can generate light that is monochromatic (single-wavelength), multi-chromatic (multiple wavelengths), or broad-band (a spectrum of wavelengths). The light source 222 can be, but not limited to, any of the following: incandescent sources, fluorescent sources, light-emitting diodes (LEDs), lasers, laser diodes, and other sources. The light generated by the light source 222 can be continuous wave, frequency or temporally modulated light. A calibration module 223 and a measuring module 224 are also included in the system 220. An operator can use the calibration module 223, which includes 'standard' samples with known parameters, to calibrate the system 220 and help maintain stability. The samples used in the calibration module 223 can be one or more materials such as gas, liquid, or solid materials that can generate reliable signals in a controlled environment. In some implementations, the calibration module 223 can include any systems that can generate a desired signal with known properties for calibration purposes. For example, an acousto-optic modulator (AOM) that can shift the frequency of the incident photons can be employed. The signals received from either the calibration module 223 or the measuring module 224 will be detected by a spectrometer 225 including a highly-dispersive optical device, which in this example is a virtually-imaged phased array (VIPA) 228, sensors 227, and a control module 226. The control module 226 is able to communicate and control various mechanisms in the spectrometer device, such as temperature control systems, and motorized stages to move certain optical or physical components. The system 220 may include a variety of hardware components including optical components, various combinations of light sources, lenses, collimators, beam splitters, mirrors, optical isolators, single or multi-mode optical fibers, bundles, waveguides or optical couplings, polarizers, shutters, filters, amplifiers, attenuators, filters and so forth. Not all of these components are shown, but as an example, lenses of a mode matching component 230 are used to appropriately shape a beam size for light being delivered to a target (e.g., a sample being measured) through an objective lens 234 and to the calibration module 223 via a beamsplitter 232. The system 220 provides light from the light source 222 and collects light signals generated by interaction with a sample (e.g., a Brillouin scattering interaction) into the spectrometer 225 via the beamsplitter 232, so that the light signals can be analyzed. In other examples, instead of a beamsplitter, any of a variety of other types of optical switches can be used to perform the routing of incident light and calibration or target light signals. The sensors 227 can include various image sensors, including various charge-coupled device (CCD) such as electron-multiplying (EMCCD), photodiode sensors, or active-pixel sensor (CMOS sensor) etc.

Figure 3A:
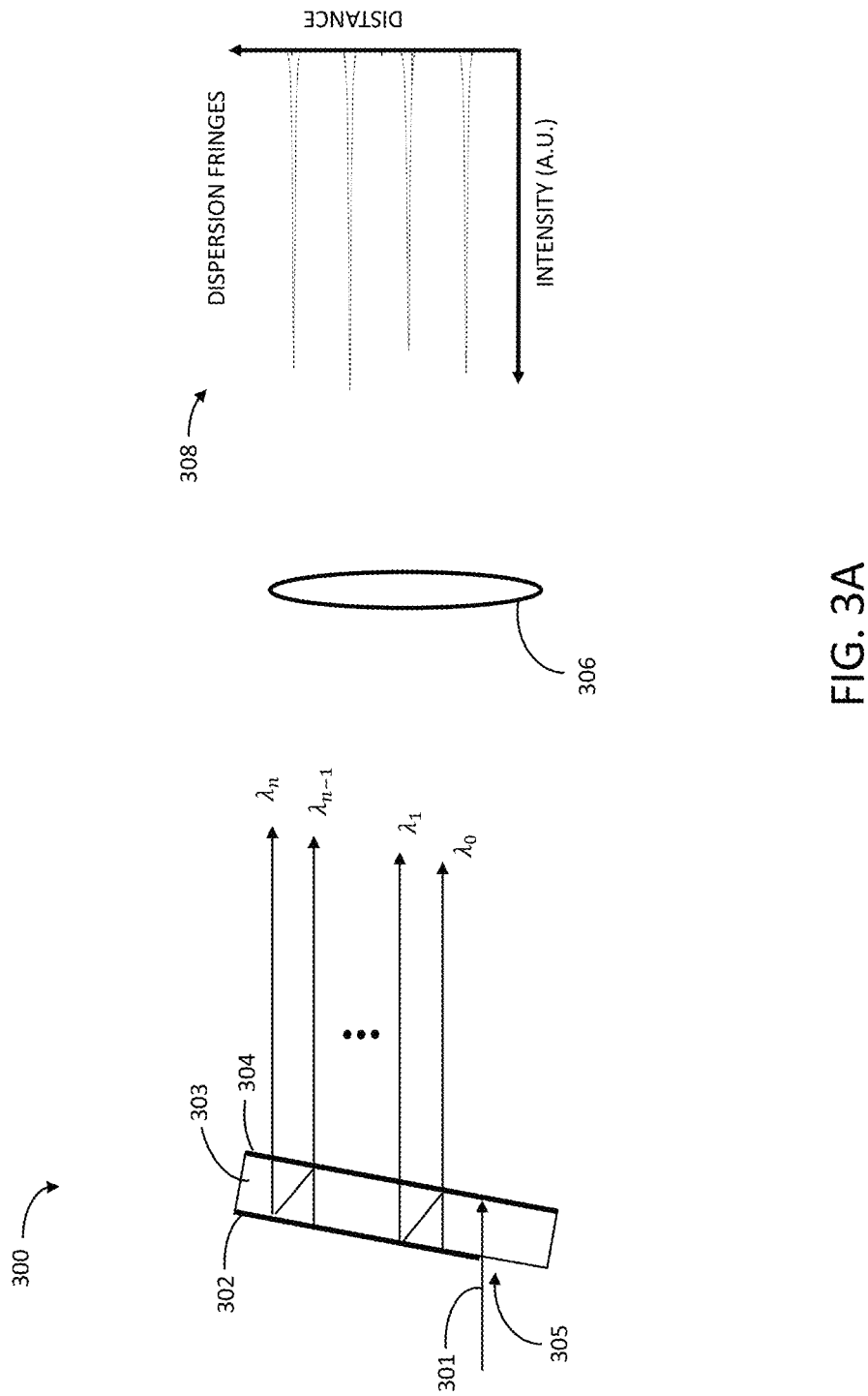
FIG. 3A is an illustration of an example VIPA and dispersion fringes.

FIG. 3A illustrates an example of a VIPA component 300 that can be used in any of a variety of implementations of a spectroscopy measurement system. The VIPA component 300 is an etalon-structured angular dispersive device that splits incident light 301 from a light source entering the VIPA component 300, through an anti-reflection coated window 305, into its spectral components (with wavelengths $\lambda_0$ to $\lambda_n$). The VIPA component 300 has a highly-reflective surface 302 and a partially reflective surface 304 on either side of a spacer 303 (e.g., consisting of fused silica). The VIPA component 300 has a higher angular dispersion, but has a smaller free spectral range, than some other types of dispersive optical devices such as prisms or diffraction gratings. With a focusing optical component 306 (e.g., one or more lenses), the dispersion pattern from the VIPA component 300 can be projected on a screen, for example a sensor array, to generate an optical interference pattern (also called "dispersion fringes" or simply "fringes"). A fringe plot 308 shows an example of the intensity of the fringes as a function of distance across a sensor array, where each fringe represents a corresponding spectral component.

Figure 3B:
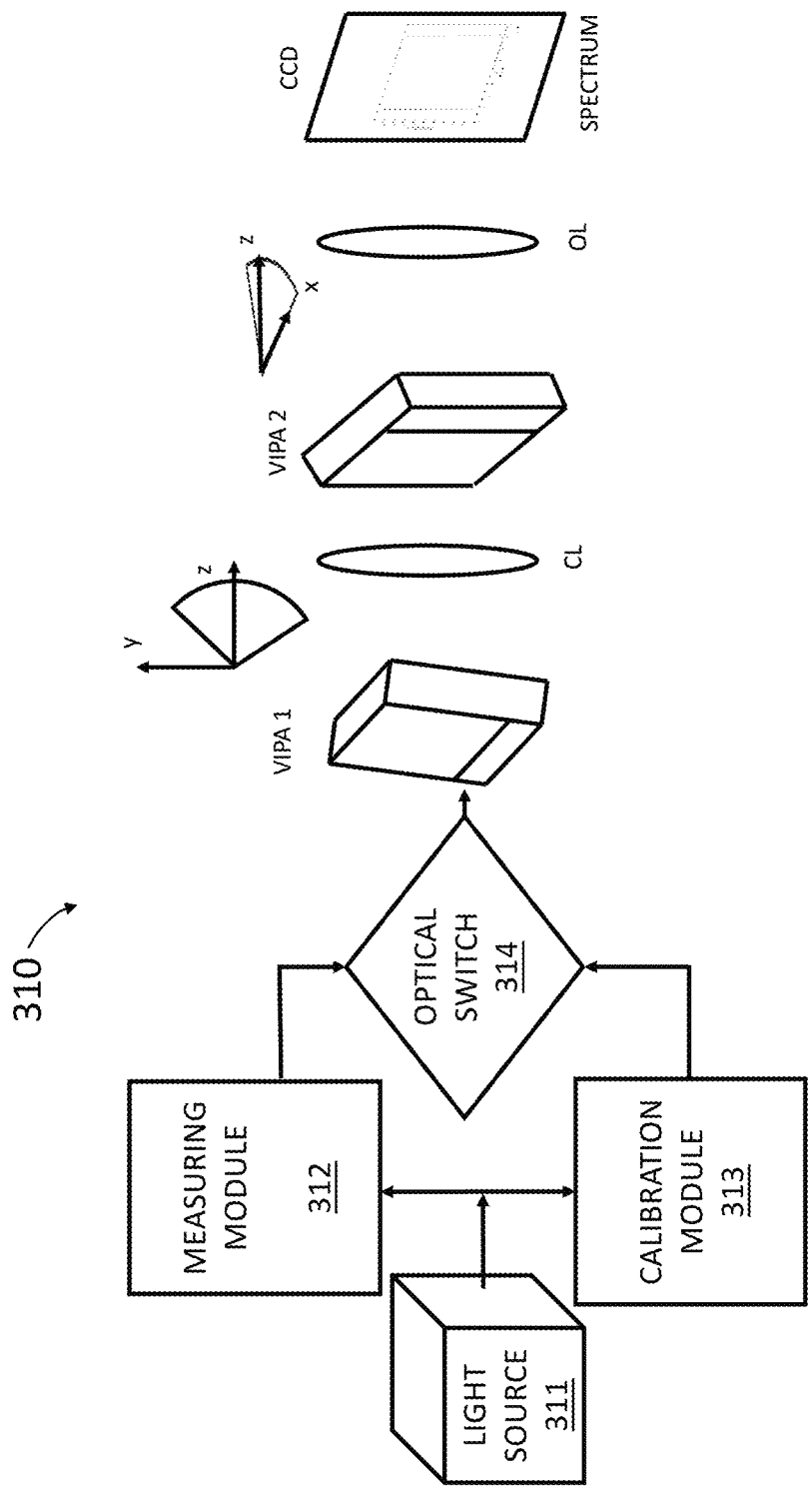
FIG. 3B is a schematic diagram of an exemplary system involving two-stage VIPAs.

FIG. 3B is an example of a measurement system 310 using two stage-VIPA spectrometer subsystem that includes two interferometer stages. The measurement system 310 also includes a light source 311, a measuring module 312, a calibration module 313, and an optical switch 314. The spectrometer subsystem may include a VIPA (or one for each interferometer stage), an objective lens (OL), and an imager or detector array (e.g., a 2D array of detector elements, such as a charged coupled device (CCD) detector array). To provide a larger extinction ratio than would be obtained using a single VIPA, the spectrometer subsystem can be configured to use 2-stage or multi-stage VIPAs. FIG. 2 illustrates a 2-stage VIPA-based spectrometer subsystem as an example. The dispersion pattern from the first stage interferometer ('VIPA 1') dispersed in a first plane (y-z plane) is focused by a collimating lens ('CL') and dispersed again by a second stage interferometer ('VIPA 2') in the orthogonal plane (x-z plane). The final dispersion pattern is projected on the detector array as the result ('spectrum').

Figure 4A:
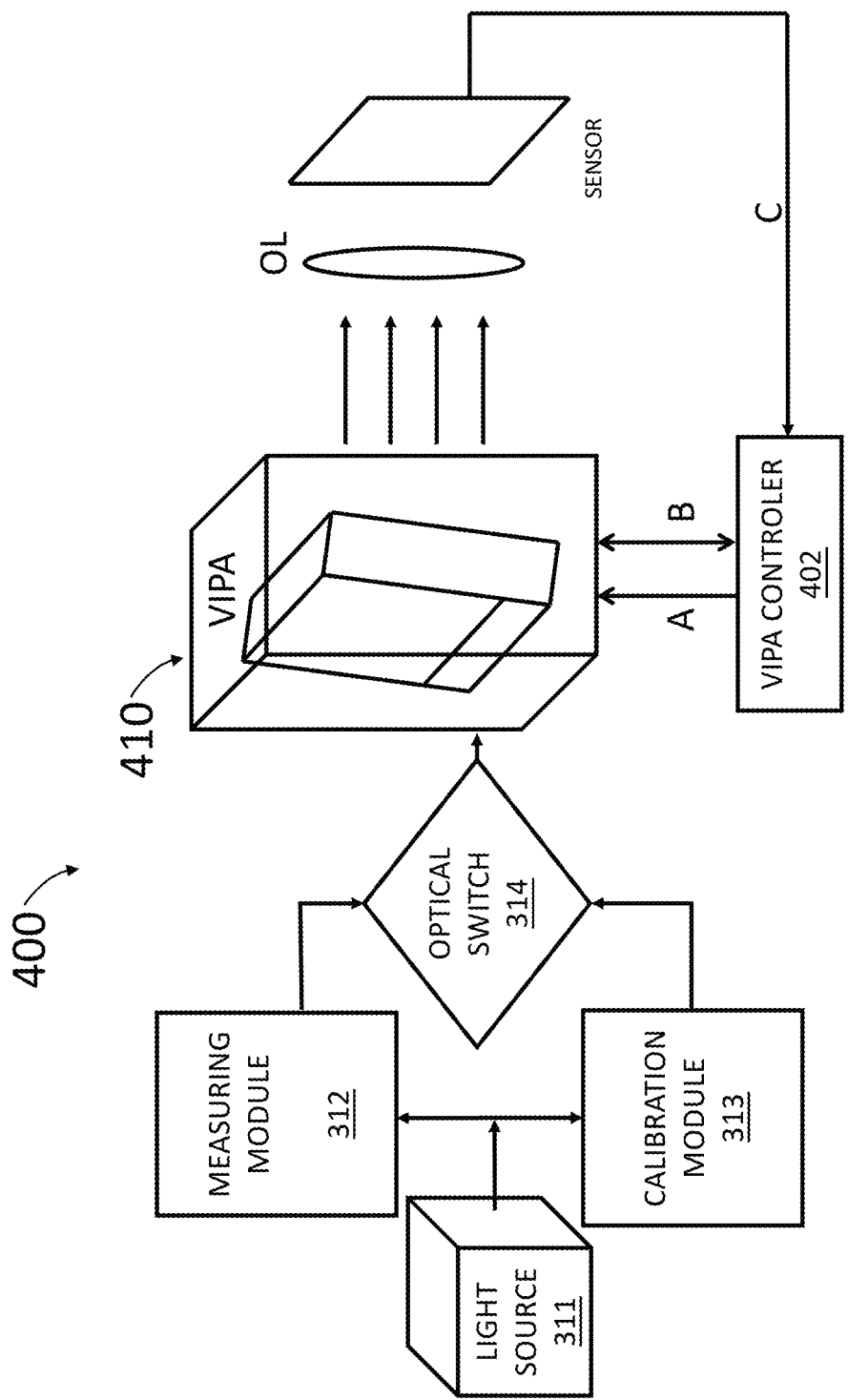
FIG. 4A is a schematic diagram of an exemplary embodiment of the VIPA control system.
Figure 4B:
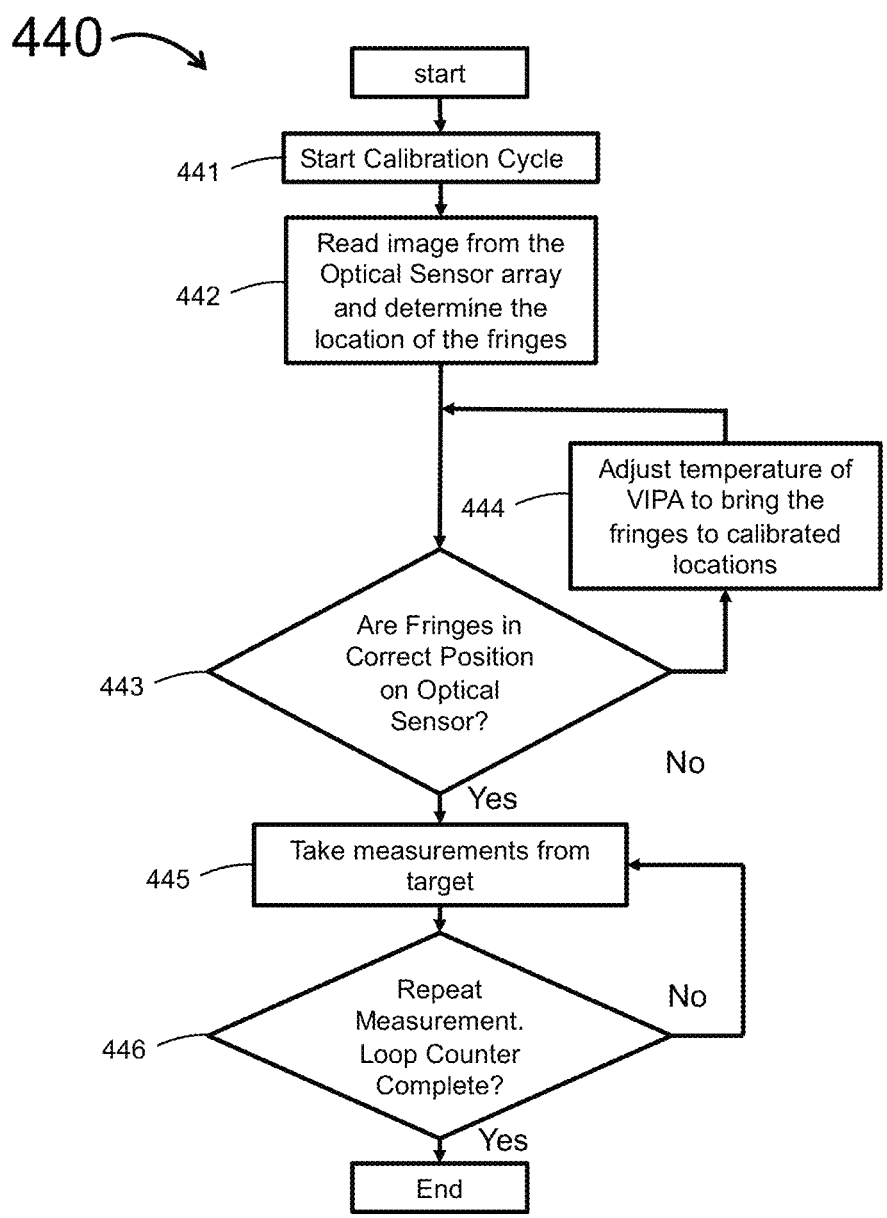
FIG. 4B is a flowchart of an example algorithm performed using the VIPA control system.

Referring to FIG. 4A, an example measurement system 400, in accordance with aspects of the present disclosure, is shown. In general, the measurement system 400 includes the light source 311, measuring module 312, calibration module 313, and optical switch 314 described in the example measurement system 310 and a temperature-controlled VIPA component 410 controlled by a VIPA controller 402. In this example, the VIPA component 410 includes a single VIPA enclosed in a temperature control module, but other examples can include more than one VIPA in the same temperature control module or more than one temperature control modules enclosing respective VIPAs. A closed-loop control system between the VIPA component 410 and the VIPA controller 402 is engineered to control the temperature of the VIPA(s) of the VIPA component 410. Temperature sensing and control signals (B) are used in a temperature-control feedback loop. There may also be additional feedback loops that use other properties for providing additional stability. For example, in this example, a control signal (A) is used in a light-control feedback loop in which the feedback signal (C) can be the location of the fringe peaks on the sensor screen. When ambient temperature of the system 400 changes, optical parameter and the physical dimension of the spacer of the VIPA etalon will vary, and further leads to fringe shifts on the sensor (e.g., as described in more detail below with reference to FIGS. 5A-5D). A negative feedback control system to move the temperature of the VIPA in the opposite direction will therefore stabilize the fringe location and thus maintain measurement accuracy of the system 400. An exemplary algorithm workflow 440 is shown in FIG. 4B. When the drifts of the spectrum are primarily caused by the VIPA drifting, the system 400 can also use a control algorithm to maintain a constant temperature of the VIPA. The workflow 440 starts by performing (441) a start calibration cycle, followed by reading (442) an image from the optical sensor array to determine the location of the fringes. In a feedback loop, the workflow 440 tests (443) whether the fringes are in the correct position on the optical sensor, and if necessary, adjusts (444) the temperature of the VIPA to bring the fringes to their calibrated locations. When no adjustments are needed, the workflow 440 takes measurements (445) from the target in a loop in which measurements are repeated until a loop counter is complete (446), in which case the workflow 440 ends.

Figure 4C:
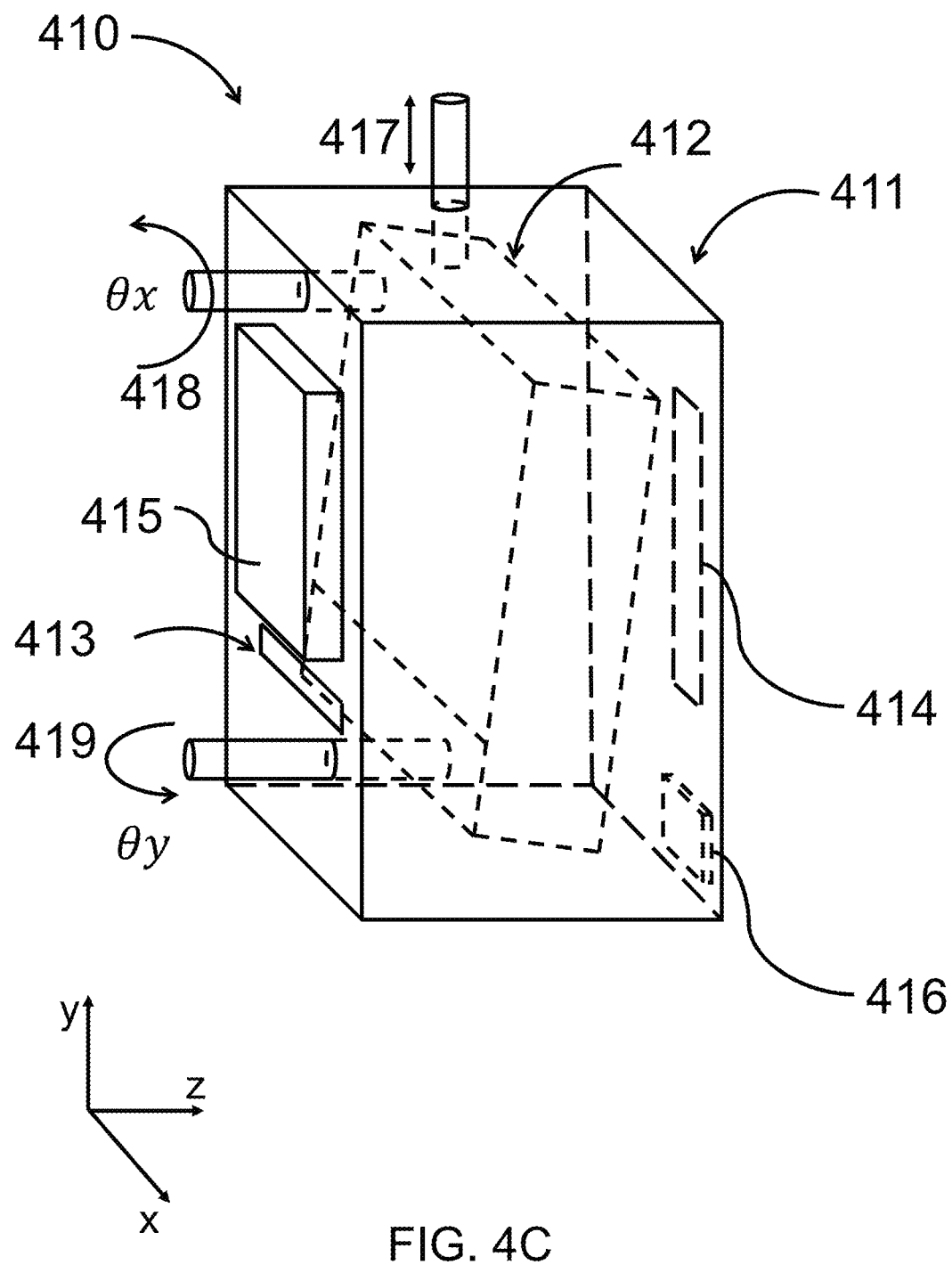
FIG. 4C is a perspective view that illustrates an exemplary embodiment of the VIPA temperature module.

FIG. 4C illustrates one example of the VIPA component 410 configured to use a temperature control module. The interferometer VIPA 412 can sit in a closed, thermally isolated chamber 411 with anti-reflection-coated-optical windows 413 (for the input beam) and 414 (for the output dispersion pattern) to minimize insertion loss of the light. To achieve good thermal insulation, a layer of thermal isolation materials such as fiberglass, mineral wool or thermal insulation foam can be added inside the chamber 411. A heating/cooling device 415, for example, a thermoelectric (TEC) Peltier, or any heating mechanism using electric device such as heating resistor, or heating pad etc. with a heat sink is used to control the temperature of the module. The temperature control module can also be configured to use heating pads, wraps made from electrical resistor, or wraps of thermal conducting materials connected to a heating/cooling device directly on the interferometer. A thermal sensor 416 provides temperature readings for the control algorithm. Access to VIPA vertical elevation 417 and tilting angles in Roll ($\theta_r$) 418 and Yaw ($\theta_p$) 419 can be provided for optical alignment.

Figure 4D:
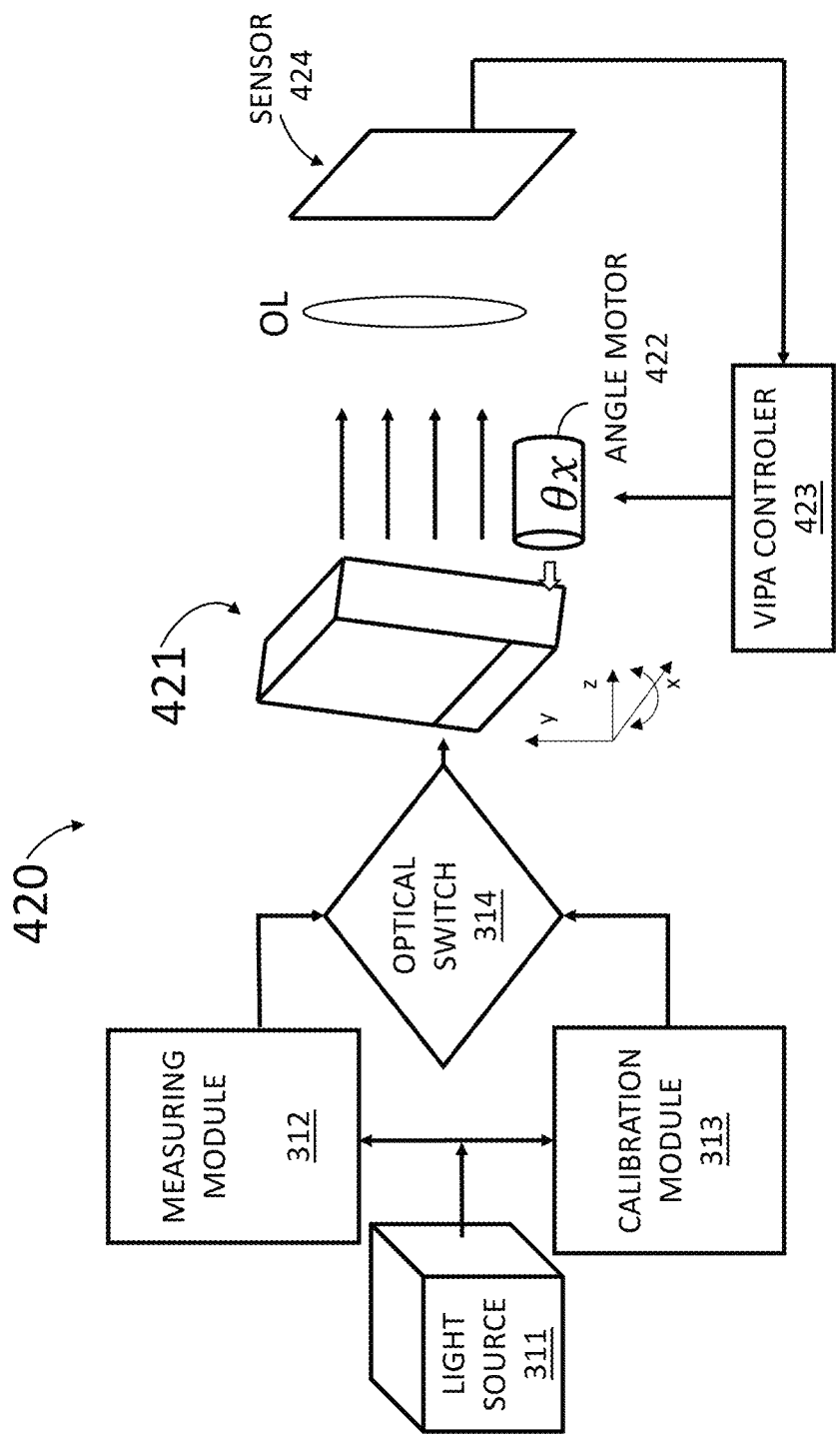
FIG. 4D is a schematic diagram of an exemplary embodiment of the angle-tuning VIPA control system.

In some aspects of this disclosure, a closed-loop-controlled angle-tilting interferometer component 421 is provided as is shown in an exemplary measurement system 420 (FIG. 4D). Interferometric structures like VIPAs or other etalons can be tuned by angle-tilting techniques to achieve certain performance goals. In this example, the interferometer component 421 includes a VIPA that is tilted by an angle motor 421 based on a signal provided by a VIPA controller 423. Generally, the transmission peaks in the spectrum of light passing through the VIPA move to shorter wavelengths when the tilt angle is increased, and vice versa. When the input wavelength (frequency) drifts, tilting can move the transmission peak to the opposite direction to cancel out the drifting effects. The interferometer component 421 functions as a wavelength (frequency) filter in this manner. The physical location of the dispersion pattern on the detector array 424 can be used as feedback of the control algorithm. Tilting of the VIPA in a plane which includes the optical axis will cause shifts of the signal in a monotonic fashion. A negative feedback closed loop algorithm can minimize the physical drifts of the signal by controlling the tilting angle.

Figure 4E:
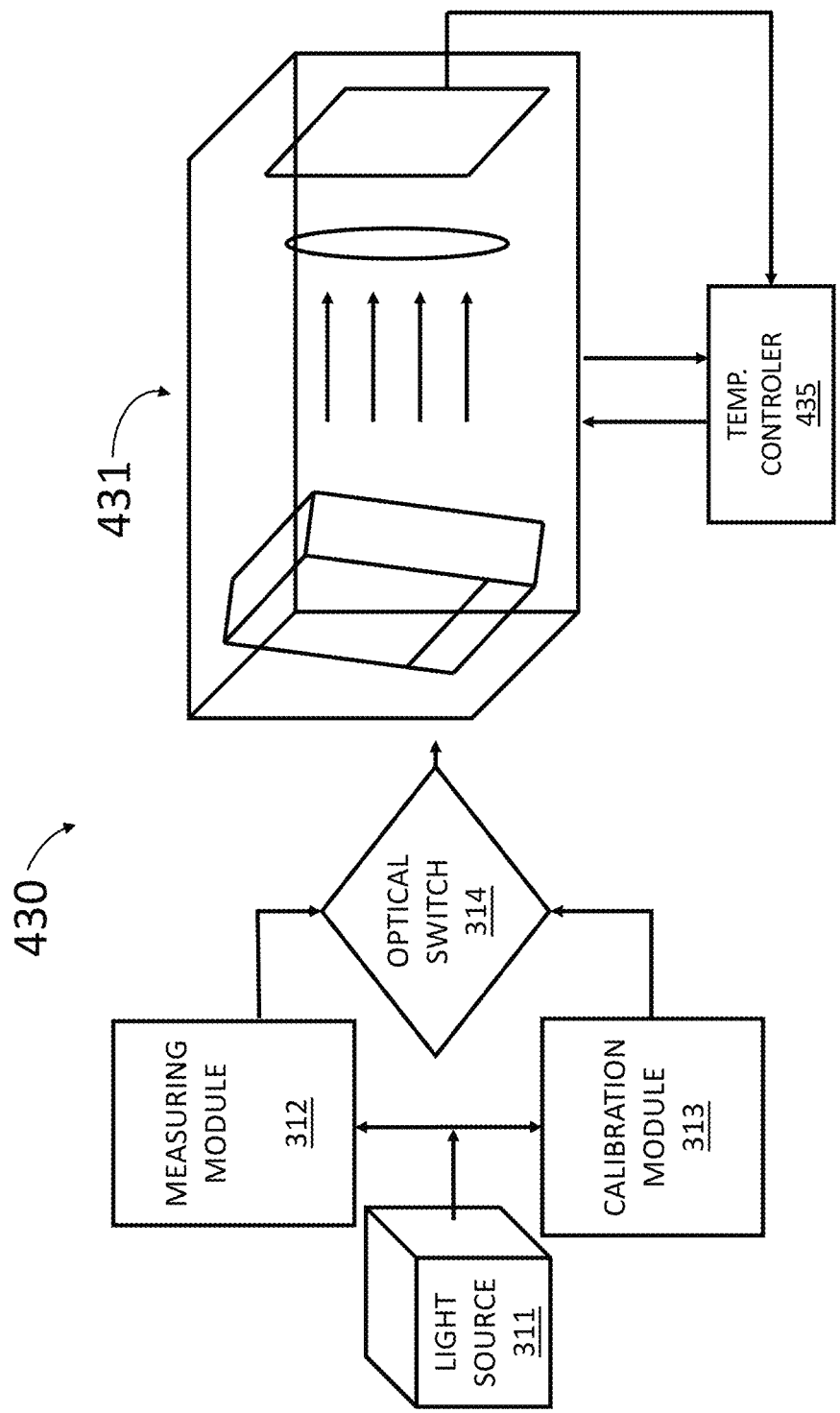
FIG. 4E is a schematic diagram of an exemplary embodiment of the spectrometer temperature control system.

FIG. 4E illustrates an example of a measurement system 430 in which an enclosure 431 maintains a temperature-controlled environment that includes both a VIPA and a sensor array, where the temperature is controlled by a temperature controller 435. A variety of other implementations can include other components within the same temperature-controlled thermal environment as the interferometric structures used by the system.

Figure 6:
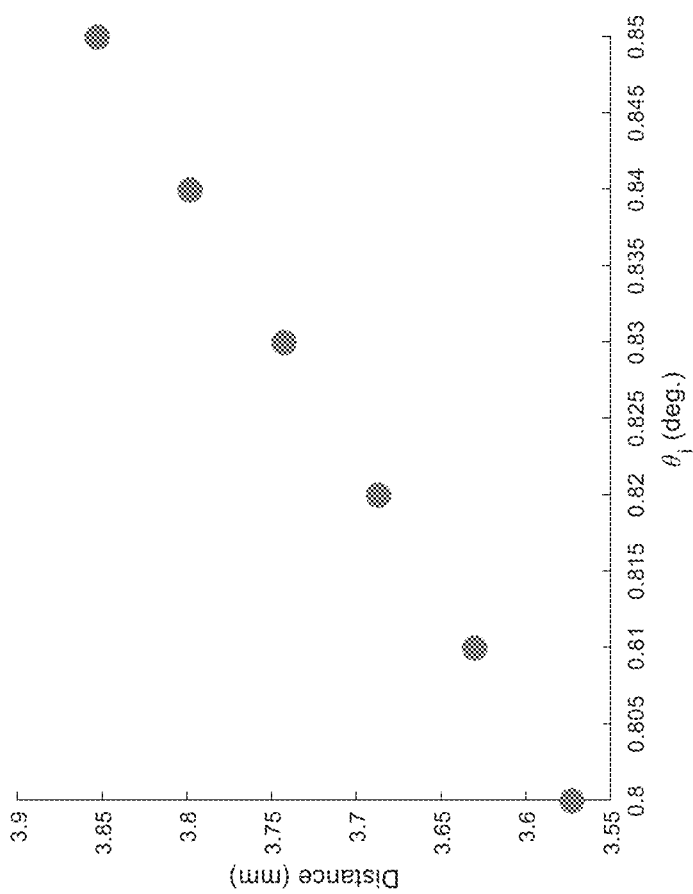
FIG. 6 is a plot that shows dispersion fringe shift by incident angle-tuning.

FIG. 6 shows the effects of angle-tuning on fringe locations on the screen, as drifts of the $1^{st}$ order peak with distance between locations of a peak on the screen as a function of incident angle variations, from 0.8 to 0.85° with a 0.1° increment. With a measurement system setup using a 21.6 GHz-FSR fused silica VIPA at 780 nm (physical thickness ~4.72 mm), and f=100 mm focusing optical lens, the peak drifts almost 0.3 mm in the vertical direction in a monotonic fashion.

Figure 5B:
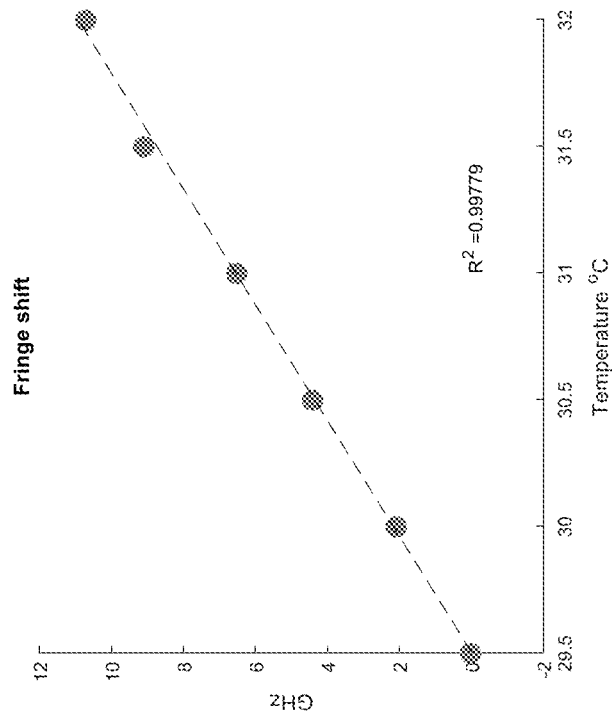
Figure 5A:
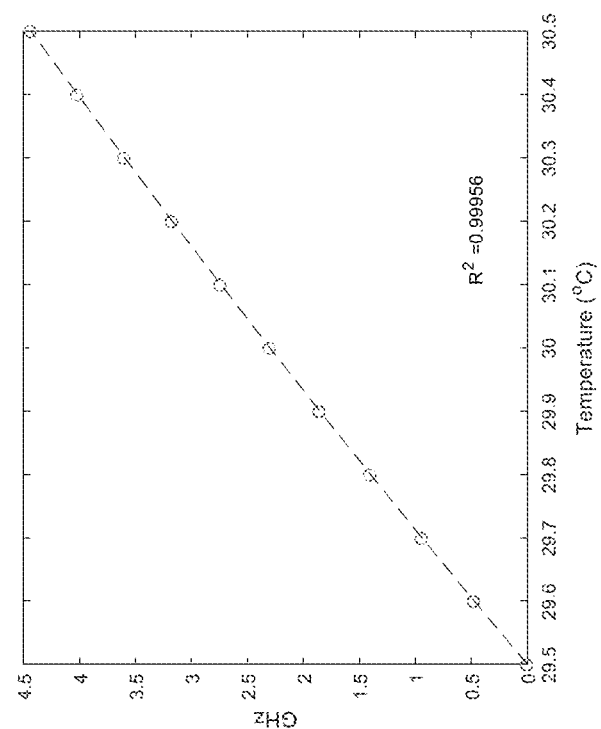

These properties changes will cause drifts of the dispersion pattern of the VIPA on the detector array (as shown in FIGS. 5A and 5B). Examples of dispersion characteristics associated with VIPAs are described in more detail, for example, in S. Xiao, S. Member, A. M. Weiner, and C. Lin, "A Dispersion Law for Virtually Imaged Phased-Array Spectral Dispersers Based on Paraxial Wave Theory," vol. 40, no. 4, pp. 420-426, 2004, incorporated herein by reference. An example material that can be used for VIPA fabrication are various types of glass. When temperature changes, the optical length of the etalon changes, due to physical thickness change caused by thermal expansion of the cavity material used as a spacer, and the refractive index change of that cavity material. Fused silica, one type of glass, has a thermal expansion rate of $0.5 \times 10^{-6}/°$ C., and refractive index change rate of $8 \times 10^{-6}/°$ C. Index change (as shown in FIG. 5C) will dominate and cause a dramatic change in terms of frequency (as shown in FIG. 5D) based on simulation using the dispersion law of VIPA.

For the same 4.72 mm thick fused silica-based VIPA at 780 nm, the fringe change rate is about ~4.431 GHz/° C., with the linear fitting results $freq_{shift}$=4.431×T−130.665 ($R^2$=0.9996). This matches well with the fringe change rate of ~4.379 GHz/° C. with the linear fitting to experiments data. In the experiments, the VIPA was positioned in a temperature-controlled enclosure to maintain the targeting temperature. The drift caused by 1-° C. ambient temperature change is very close to the Brillouin frequency shift for soft tissue at this wavelength. For example, Brillouin frequency shift of a healthy human cornea in natural status is ~5.7-5.8 GHz.

Figure 5E:
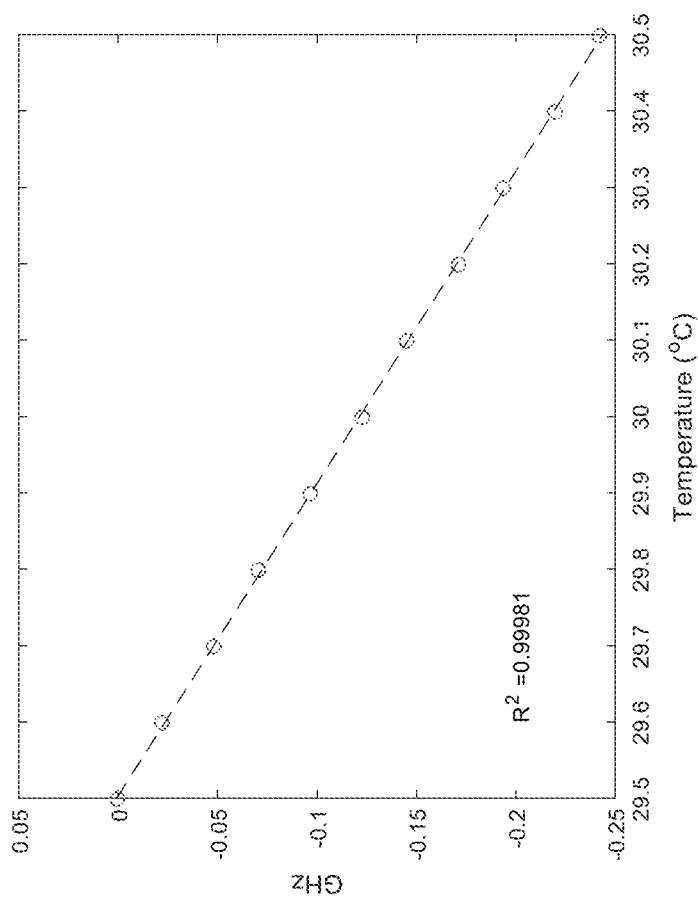

Air-spaced VIPA (FIG. 5E) is preferable to minimize the drift caused by ambient temperature changes. However, this will not necessarily solve the problem entirely. A drift of 242.52 MHz/° C. is still expected for an air-spaced VIPA with a spacer thickness of ~4.72 mm, as shown in FIG. 2C, which is caused by refractive index changes of air due to temperature variations. Besides, an air-spaced VIPA may be economically expensive and technically difficult to fabricate.

Figure 7:
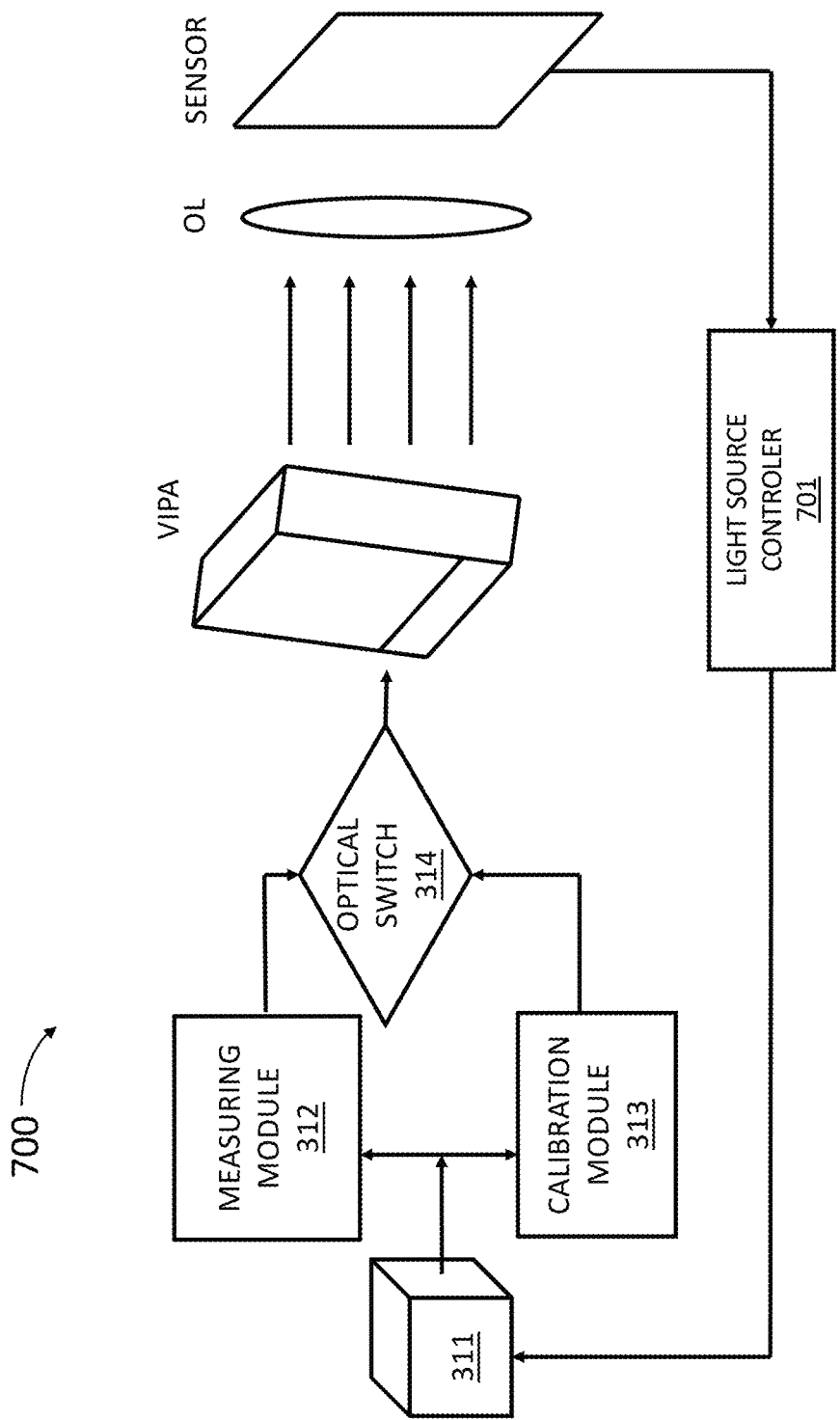
FIG. 7 is a schematic diagram that shows an exemplary embodiment of light source control.

In some aspects of this disclosure, a wavelength (frequency)-tunable light source using the laser is provided (FIG. 7) in an exemplary measurement system 700. When the input wavelength varies, the location of the fringe peaks changes accordingly (FIG. 3A). Control of the peak locations on the sensor screen can be achieved by creating a closed-loop light source controller 701. Drift of the fringe will be used as feedback of the control system. The control system will actively control the output of the laser wavelength (frequency) to compensate the fringe or spectrum drift. Change of laser output center wavelength (frequency) can be, for example, achieved by changing the incident angle of a grating system inside the light head.

Figure 8:
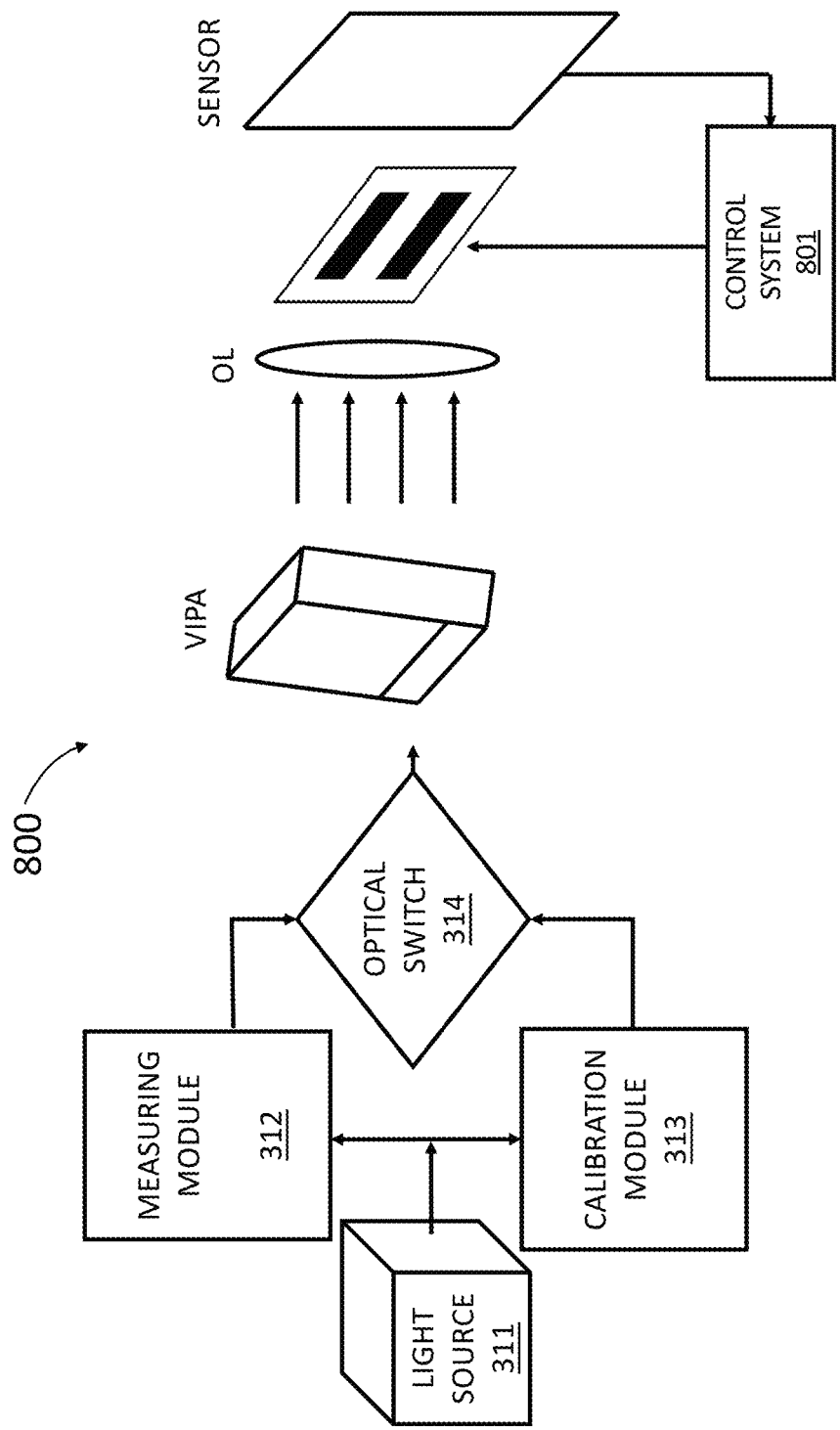
FIG. 8 is a schematic diagram that shows an exemplary embodiment of physical mask control.

In another exemplary measurement system 800, a closed-loop-controlled physical mask window to chase the spectrum is provided (FIG. 8). The negative-feedback closed-loop control system 801 uses the spectrum location on the detector array as the feedback input, to control a physical spatial filter in order to generate a stabilized spectrum on the detector for further data recording and analysis. A motorized scheme, for example, a linear actuator, servo & step motors or similar equipment can be employed to translate the filter in the drifting axis. The spatial filter can be simply a window with clear sharp edges to let pass the spectrum other than the Rayleigh peaks in the spectral data. Peaks of the signals, 'center of the mass' of the spectrum or other features of the spectrum sensed by the detector array can be employed as an indicator of the spectrum location. Any of a variety of types of control algorithms can be used such as, for example, proportional-integral (PI), or proportional-integral-derivative (PID) control algorithms can. The sensor screen and the mask can also be moved together using the motion scheme used, as an integrated module to sense a stabilized spectrum.

Figure 9A:
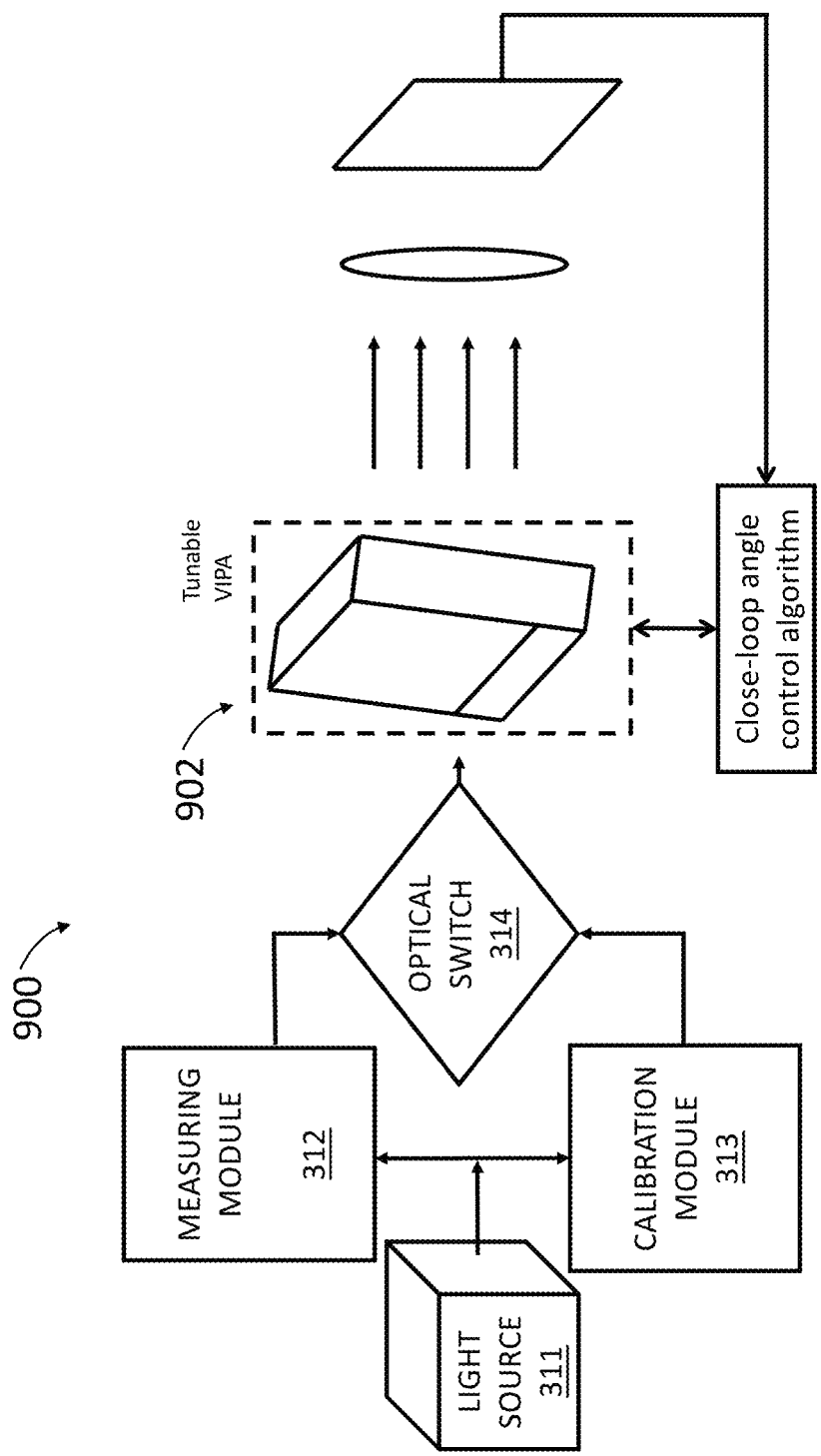
FIG. 9A is a schematic diagram that illustrates an exemplary embodiment of the tunable VIPA control.
Figure 9C:
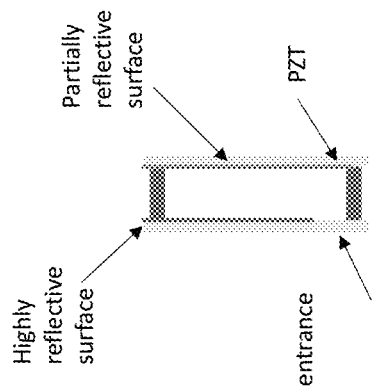
FIGS. 9B and 9C are schematic diagrams of example tunable VIPA configurations.
Figure 9B:
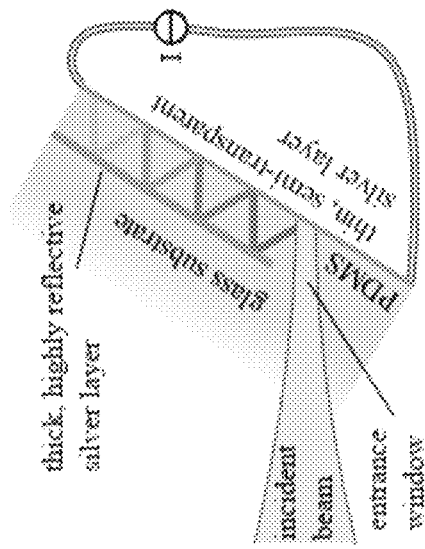

Referring to FIG. 9A, in another exemplary measurement system 900, a tunable interferometer 902 is included. Dispersion performance of a tunable VIPA can be adjusted by a certain mechanism. In an exemplary system implementation, a tunable VIPA with its cavity filled with semi-transparent and thermally expandable elastomer is used. By controlling the thermal status of the VIPA, the dispersion performance can be changed to adjust the spectrum. In one exemplary tunable VIPA implementation, shown in FIG. 9B, a poly-dimethylsiloxane (PDMS) material is used on a glass substrate with a thick, highly reflective silver layer on one side, and a thin, semi-transparent silver layer on the other side. The PDMS optical path length can be tuned using a current source. In another exemplary tunable VIPA implementation, shown in FIG. 9C, an air-spaced piezo-based tunable etalon (VIPA) is used. The light path, and therefore the dispersion performance can be tuned using the piezo-electric transducer (PZT) component to change the distance between the highly reflective surface and the partially reflective surface. When a tunable VIPA is involved, the system can either stabilize the dispersion performance of the VIPA (using feedback from the VIPA (A)), or adjust it with spectrum change information as feedback (B) in the closed-loop control system.

Various techniques can be combined with techniques described herein for configuring and using the systems described herein, including for example techniques described that are described in P. Jacquinot, "The luminosity of spectrometers with prisms gratings or Fabry-Perot etalons," J. Opt. Soc. Am. 44(10), 761-765 (1954), incorporated herein by reference; and in K. J. Koski, J. Muller, H. D. Hochheimer, and J. L. Yarger, "High pressure angle-dispersive Brillouin spectroscopy: A technique for determining acoustic velocities and attenuations in liquids and solids," Rev. Sci. Instrum. 73(3), 1235-1241 (2002), incorporated herein by reference.

As used herein, "light" refers to electromagnetic waves that have a spectrum that has a peak wavelength that falls in a particular range of optical wavelengths (e.g., between about 100 nm to about 1 mm, or some subrange thereof).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:
1. An optical spectrometer, comprising:
a first set of one or more optical elements configured to provide input light, where the input light comprises an optical signal associated with a spectrum of at least a portion of the input light;
an interferometer configured to receive the input light from the first set of one or more optical elements and to provide output light;
a detector array comprising multiple detection elements, where the detector array is configured to provide data comprising an image;
a second set of one or more optical elements configured to receive the output light from the interferometer and to provide an optical interference pattern associated with an intensity of at least a portion of the output light that is distributed over a set of detection elements of the detector array; and
a control system configured to stabilize detection of the optical signal based at least in part on the data comprising the image, the control system comprising one or both of:
a light-control module configured to control a first feedback loop that stabilizes the portion of the output light that is distributed over the set of detection elements; and/or
a temperature-control module configured to control a second feedback loop that stabilizes a temperature sensed by at least one temperature sensor within a thermal environment associated with the interferometer.

2. The optical spectrometer of claim 1, wherein at least one of the first feedback loop or the second feedback loop is configured to use the data comprising the image to provide feedback.

3. The optical spectrometer of claim 2, wherein the data comprising the image is used to provide feedback that includes respective spatial positions of one or more spectral components represented in the image.

4. The optical spectrometer of claim 1, wherein the control system is configured to use the data comprising the image to determine an operational range over which at least one of the first feedback loop or the second feedback loop operates.

5. The optical spectrometer of claim 4, wherein the first feedback loop provides a measurement that is used to determine an operational range over which the second feedback loop operates.

6. The optical spectrometer of claim 1, wherein the control system comprises the light-control module.

7. The optical spectrometer of claim 6, wherein a rotation stage controlled by the first feedback loop is configured to tilt at least a portion of the interferometer to change the optical interference pattern.

8. The optical spectrometer of claim 7, wherein the interferometer comprises at least one Febry-perot etalon, or at least one virtually-imaged phased array (VIPA).

9. The optical spectrometer of claim 6, wherein at least one optical element in the first set of one or more optical elements or the second set of one or more optical elements and controlled by the first feedback loop is configured to change an angle of propagation of at least a portion of the input light or the output light such that the set of detection elements of the detector array over which the portion of the output light is distributed changes.

10. The optical spectrometer of claim 6, wherein a beam-blocking element that blocks at least a portion of the output light and is controlled by the first feedback loop is configured to move as an angle of propagation of at least a portion of the output light changes and the set of detection elements of the detector array over which the portion of the output light is distributed changes.

11. The optical spectrometer of claim 6, wherein at least one optical element in the first set of one or more optical elements or the second set of one or more optical elements and controlled by the first feedback loop is configured to provide absorption of optical power over a portion of the spectrum.

12. The optical spectrometer of claim 6, wherein the input light is provided from a measurement system that receives light from a frequency-tunable light source that is controlled by the first feedback loop and is configured to tune a frequency of the light received by the measurement system such that the set of detection elements of the detector array over which the portion of the output light is distributed changes.

13. The optical spectrometer of claim 6, wherein the interferometer has a tunable characteristic that is controlled by the first feedback loop and is configured to change the optical interference pattern.

14. The optical spectrometer of claim 13, wherein the interferometer comprises at least one tunable Fabry-Perot etalon, or at least one virtually-imaged phased array (VIPA).

15. The optical spectrometer of claim 1, wherein the control system comprises the temperature-control module.

16. The optical spectrometer of claim 15, wherein the thermal environment is characterized by an ambient temperature within a thermally isolated chamber in which the interferometer is enclosed.

17. The optical spectrometer of claim 16, wherein the thermally isolated chamber encloses the interferometer and the detector array.

18. The optical spectrometer of claim 16, wherein the temperature-control module comprises the thermally isolated chamber, a temperature sensor thermally coupled to the thermally isolated chamber, and a heating element thermally coupled to the thermally isolated chamber.

19. A method for analyzing an optical spectrum, the method comprising:
providing input light using a first set of one or more optical elements, where the input light comprises an optical signal associated with a spectrum of at least a portion of the input light;
receiving the input light from the first set of one or more optical elements into an interferometer, and providing output light from the interferometer;
providing data comprising an image using a detector array comprising multiple detection elements;
receiving the output light from the interferometer into a second set of one or more optical elements and providing from the second set of one or more optical elements an optical interference pattern associated with an intensity of at least a portion of the output light that is distributed over a set of detection elements of the detector array; and
stabilizing detection of the optical signal based at least in part on the data comprising the image using a control system, the control system comprising one or both of:
a light-control module that controls a first feedback loop that stabilizes the portion of the output light that is distributed over the set of detection elements; and/or
a temperature-control module that controls a second feedback loop that stabilizes a temperature sensed by at least one temperature sensor within a thermal environment associated with the interferometer.

* * * * *